United States Patent
Subramanian

(10) Patent No.: US 10,334,629 B2
(45) Date of Patent: Jun. 25, 2019

(54) CHANNEL ACCESS AND FAIRNESS PROTOCOL FOR CONTENTION-BASED-ACCESS NETWORKS WITH BIASED DETECTION

(71) Applicant: xG Technology, Inc., Sarasota, FL (US)

(72) Inventor: Sankrith Subramanian, St. Petersburg, FL (US)

(73) Assignee: Vislink Technologies, Inc., Sarasota, FL (US)

(*) Notice: Subject to any disclaimer, the term of this patent is extended or adjusted under 35 U.S.C. 154(b) by 0 days.

(21) Appl. No.: 15/659,793

(22) Filed: Jul. 26, 2017

(65) Prior Publication Data

US 2018/0042051 A1 Feb. 8, 2018

Related U.S. Application Data

(60) Provisional application No. 62/370,796, filed on Aug. 4, 2016.

(51) Int. Cl.
*H04W 74/08* (2009.01)
*H04B 7/26* (2006.01)

(52) U.S. Cl.
CPC ....... *H04W 74/0825* (2013.01); *H04B 7/2643* (2013.01)

(58) Field of Classification Search
CPC .. H04W 74/00–0891; H04W 72/04–14; H04B 7/204; H04B 7/212–2123; H04B 7/2643
USPC ......... 370/329, 336, 337, 345–348, 445–461
See application file for complete search history.

(56) References Cited

U.S. PATENT DOCUMENTS

| | | | | |
|---|---|---|---|---|
| 6,236,662 | B1* | 5/2001 | Reilly | H04W 52/46 370/462 |
| 2009/0067389 | A1* | 3/2009 | Lee | H04W 74/02 370/336 |
| 2010/0014503 | A1* | 1/2010 | Shukla | H04W 74/02 370/345 |
| 2010/0118838 | A1* | 5/2010 | Gandham | H04L 1/1887 370/336 |
| 2011/0026409 | A1* | 2/2011 | Hu | H04L 1/1867 370/243 |
| 2015/0244632 | A1* | 8/2015 | Katar | H04L 47/2433 370/230 |

* cited by examiner

*Primary Examiner* — Allahyar Kasraian
(74) *Attorney, Agent, or Firm* — Dennis L. Cook, Esq.

(57) ABSTRACT

A channel access protocol method to impart bandwidth fairness while maximizing throughput in a class of contention-based-access (CBA) TDMA networks that has no carrier sense capability, and that experiences biased detection at the receiver (base station) by virtue of physical layer detection algorithms is disclosed.

1 Claim, 2 Drawing Sheets

CHANNEL ACCESS AND FAIRNESS PROTOCOL FOR CONTENTION-BASED-ACCESS NETWORKS WITH BIASED DETECTION

CROSS-REFERENCE TO RELATED APPLICATION

The present application claims the benefit of previously filed Provisional Patent Application, Ser. No. 62/370,796 filed on Aug. 4, 2016.

FIELD OF THE INVENTION

The invention introduces a new protocol method to impart bandwidth fairness while maximizing throughput in a class of contention-based-access (CBA) TDMA networks that has no carrier sense capability, and that experiences biased detection at the receiver (base station) by virtue of physical layer detection algorithms.

BACKGROUND OF THE INVENTION

Contention-based medium access is a traditional medium access scheme in which each Mobile Terminal (MT) acquires channel access by sending data initiation requests in slots that are used by other MTs for the same purpose. Many variants of the contention based medium access schemes, such as ALOHA, CSMA, etc., have been used in numerous wireless technologies, such as IEEE 802.11, LTE, etc., based on its hardware and software capabilities. In this disclosure, we consider a class of wireless systems that uses a medium access scheme with no carrier sense mechanism and whose MAC "super-frame" structure has m CBA slots, where m≥2, that may be used by the MTs to access the medium.

Wireless systems that operate in interference-prone bands due to the presence of other users, such as the ISM band of 902-928 MHz, require physical layer (PHY) algorithms to handle high levels of such interference. While this is highly desired to decode data and other control bursts, PHY level interference mitigation algorithms at the Base Station (BS) may cause detection bias for a set of MTs when decoding CBA bursts. This can be due to several reasons such as receiver signal levels, uplink propagation delay, oscillator and RF characteristics, etc. Hence, fairness of the network is compromised due to resource "hogging" by the biased set of MTs.

One may argue to disable the interference mitigation algorithms operating in the PHY while decoding CBAs to impart bandwidth fairness to the network. But, such algorithms may reduce packet drops due to collisions, and hence increase the network throughput, since a CBA burst from one of the MTs may be decoded while the others may be treated as interference. In the following disclosure, we address the aforementioned issues and introduce a channel access protocol that provides bandwidth fairness to the network while maximizing the network throughput. This protocol intelligently uses the available m CBA slots, where m≥2, to detect collision, and in-turn uses this information to update the "wait" times of the MTs.

BRIEF SUMMARY OF THE INVENTION

A detailed formulation of the protocol method for CBA networks that maximizes the network throughput while maintaining bandwidth fairness is provided in the following disclosure. The protocol method in essence uses 2 or more contention-based-access slots in the TDMA MAC super-frame to manage the uplink bandwidth requests by the MTs in the network. Packet collisions are detected and the wait times of the mobile terminals are updated intelligently by this protocol.

BRIEF DESCRIPTION OF THE DRAWINGS

For a more complete understanding of the invention, reference is made to the following description and accompanying drawings, in which.

DETAILED DESCRIPTION OF THE INVENTION

Uplink channel access protocol is used by MTs to initiate data transmission and transfer control information to the BS. Fairness of transmission amongst the MTs and Quality of Service (QoS) depends on the parameters used by the channel access mechanism at the link and physical layer. To site an example of current technologies that employ channel access procedures, User Equipments (UEs) in LTE use 1 of 64 Random Access Channel (RACH) preambles to initiate channel access. If two UEs pick the same RACH preamble, there is collision at the eNodeB, while if they pick unique RACH preambles, they can then be decoded even if the preambles are sent concurrently, thus reducing the probability of collisions. For systems where the same preamble is used for the UEs, or when the number of UEs is extremely larger than the available preambles, the problem of fairness is exacerbated.

The medium access control technique of IEEE 802.11 is the Distribution Coordination Function (DCF), which is a Carrier Sense Multiple Access with Collision Avoidance (CSMA/CA) protocol that uses a binary slotted exponential backoff scheme. Packet collisions in such systems imply packet drops, unlike in the case of the class of wireless systems under consideration in this disclosure. The backoff time of a terminal in 802.11 increases exponentially after every packet collision.

Figure 1:
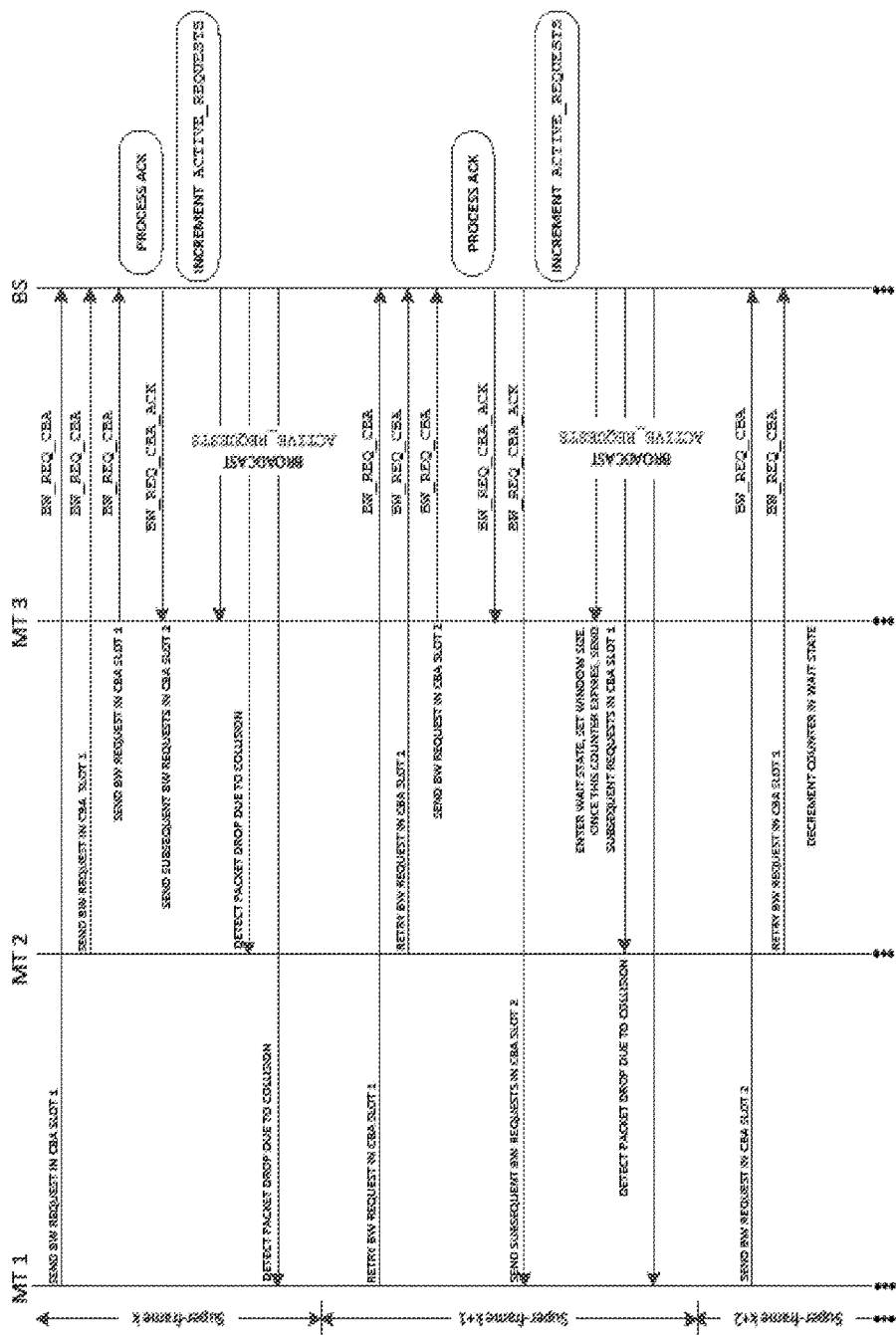
FIG. 1 shows a 3-MT scenario for the channel access and fairness protocol.
Figure 2:
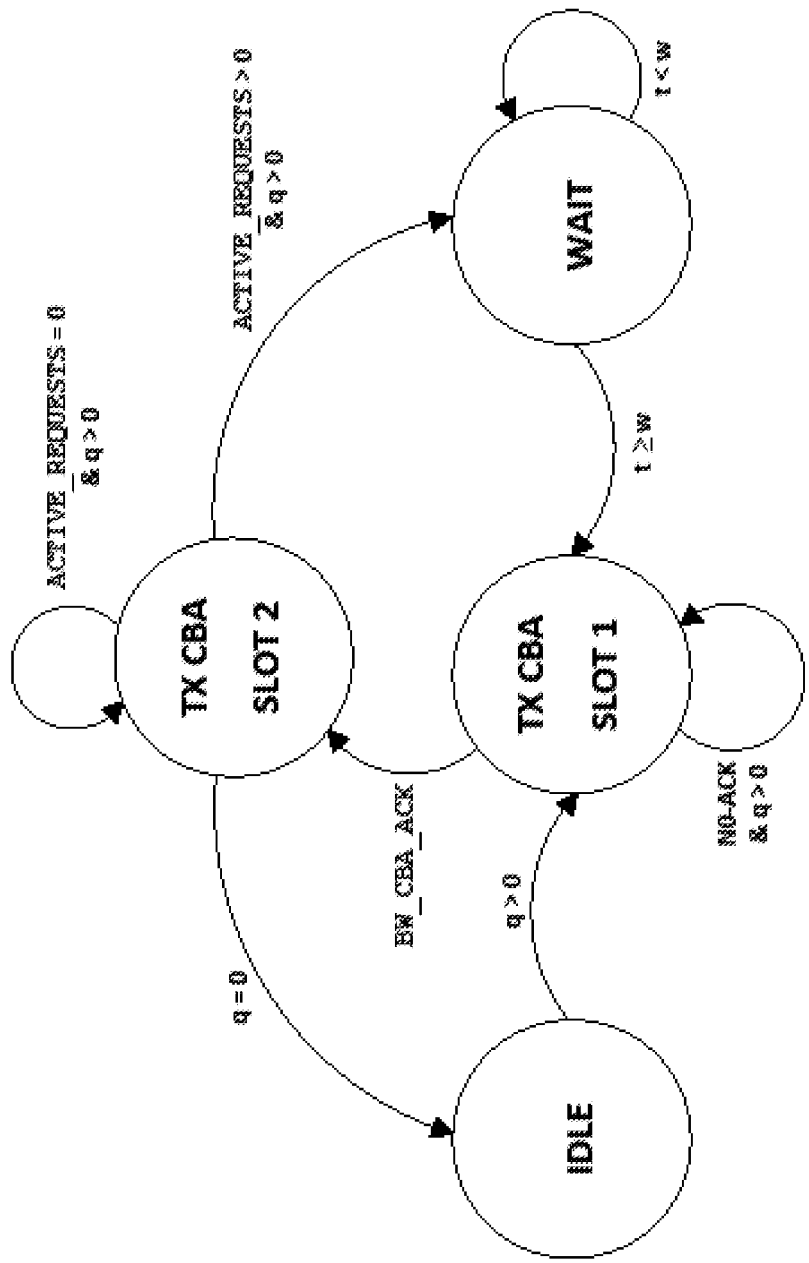
FIG. 2 shows a contending MT's software state machine.

The subsequent section enumerates the events and processes that describe the preferred embodiment channel access procedure for an instance in the network where there are 3 contending MTs, as shown in FIG. 1. Note that this description can easily be extended to a network with n contending MTs. A software state machine that supplements this procedural description is shown in FIG. 2 for a preferred embodiment network whose MAC super-frame has 2 CBA slots. This state machine can be easily extended for an m CBA slot system. In the preferred embodiment three MTs contend for channel access by each sending a bandwidth request CBA, denoted by BW_REQ_CBA, in slot 1. The BS decodes one of the 3 CBAs and replies to the successful MT with an ACK (BW_REQ_CBA_ACK), and thereafter, this MT (MT 1 in FIG. 1) sets its internal CBA state to transmit in slot 2 (i.e., TX CBA SLOT 2 in FIG. 2) in the subsequent bandwidth requests. In addition, the BS increments a control field, known as ACTIVE_REQUESTS, and broadcasts this information to all the MTs present in the network. This signal, as the name suggests, informs the MTs of the active MTs that the BS had detected by virtue of receiving their bandwidth requests, and by extension, implies that the BS had decoded a packet in slot 1 successfully. The ACTIV- E_REQUESTS field along with the BW_REQ_CBA_ACK forms part of the control burst that is sent every super-frame (BW_REQ_CBA_ACK is sent if a BW_REQ_CBA is received by the BS from the corresponding MT, and is decoded only by the intended MT, while ACTIVE_REQUESTS can be decoded by all the MTs present in the network). Note that the unsuccessful MTs will infer from the set ACTIVE_REQUESTS signal that the packet drop was as a result of collision, as packet drops may occur due to bad physical channel conditions as well.

The following bandwidth request CBAs are sent in slot 2 by MT 3 as shown in FIG. 1, while the other MTs retry their bandwidth request in slot 1. In FIG. 1 an instance where MTs 1 and 2 retry in slot 1 while MT 3 sends its bandwidth requests in slot 2 is also shown. The BS decodes the CBAs from MTs 1 and 3, and sends back the corresponding BW_REQ_CBA_ACKs. MT 1 will now set its internal CBA state to TX CBA SLOT 2 (see FIG. 2) in the subsequent bandwidth requests, while MT 2 will retry again in CBA slot 1 (i.e., TX CBA SLOT 1 in FIG. 2) in the following super-frame. As before, ACTIVE_REQUESTS is incremented and broadcasted by the BS. The (lone) MT transmitting in slot 2 uses this broadcast information to detect collision, and will enter the WAIT state (see FIG. 2). The WAIT state is an induced backoff state with a window size, denoted by $w_i$ for MT i, being a function of ACTIVE_REQUESTS. The WAIT state window size is set to (ACTIVE_REQUESTS×WAIT_STATE_FACTOR), where WAIT_STATE_FACTOR may be tuned to some non-zero integer value. If this MT has no requests in its internal queue, i.e., when q=0, it goes to the IDLE state (see FIG. 2). Once an MT enters the WAIT state, a local counter is initialized to zero, and this counter is incremented once every super-frame until the counter value is equal to the WAIT state window size. At that instance (and if q>0 for this MT), the MT goes back to contending in CBA slot 1. The field ACTIVE_REQUESTS is updated by the BS every super-frame; MTs that have been idle will be removed after some non-zero integer number of super-frames. This integer value may be tuned to allow for tracking the number of active MTs, and thereafter effect in setting the WAIT state window size $w_i$ for each MT i∈[1, 2, . . . , n] using the updated ACTIVE_REQUESTS field.

Note that, for a generalized embodiment network with m CBA slots in a super-frame and n contending MTs, the protocol method ensures that there is contention for channel access in CBA slot 1, but not in each of the CBA slots k, where k∈[2, 3, . . . , m] for a MAC super-frame with m CBA slots. This implies that there can be at-most 1 MT with q>0 in each CBA slot k. Also note from the preceding discussion that the broadcasted field ACTIVE_REQUESTS in the control packet is a field that, if toggled to a non-zero integer value, performs the following actions:

informs the MTs contending in slot 1 that were unsuccessful in super-frame j that there was a packet drop due to collision (hence these MTs will retry in CBA slot 1 in super-frame (j+1));

informs each of the lone non-contending MTs (if any) that is transmitting in slot k in super-frame j to move to slot (k+1) (i.e., TX CBA SLOT (k+1)th state) if k<m, or move to the WAIT state if k=m in super-frame (j+1), where k∈[2, 3, . . . , m] for a MAC super-frame with m CBA slots; and, sets the window size $w_i$ for MT i that moved to the WAIT state.

Since certain changes may be made in the above described channel access and fairness protocol method for proactive without departing from the scope of the invention herein involved, it is intended that all matter contained in the description thereof or shown in the accompanying figures shall be interpreted as illustrative and not in a limiting sense.

What is claimed is:

1. A channel access protocol method that maximizes network throughput while maintaining bandwidth fairness for a class of Contention-Based-Access (CBA) networks that has m, where m is a non-zero positive integer value, CBA slots for CBA bursts in a Media Access Control (MAC) super-frame comprising:

first a base station broadcasting in each super-frame a request message with a control field wherein if said control field is toggled to a non-zero positive integer value indicating the number of active requests said request message is interpreted as a bandwidth request CBA packet drop due to collision in CBA slot 1 by mobile terminals that are contending for channel access in CBA slot 1 and by, at-most, (m−1) non-contending mobile terminals that are transmitting in each of the CBA slots k, where k∈[2, 3, . . . , m] for a MAC super-frame with m CBA slots;

then, whenever said request message is interpreted as bandwidth request CBA packet drop due to collision in CBA slot 1 by the mobile terminals that are contending for channel access in CBA slot 1 in the current super-frame, the non-zero positive integer value control field indicating the number of active requests notifies said mobile terminals to retransmit bandwidth request CBA packet in CBA slot 1 in the subsequent super-frame;

then, whenever said request message is interpreted as bandwidth request CBA packet drop due to collision in CBA slot 1 by the at-most (m−1) non-contending mobile terminals that are transmitting in each of the CBA slots k, where k∈[2, 3, . . . , m] for a MAC super-frame with m CBA slots, in the current super-frame, the non-zero positive integer value control field indicating the number of active requests notifies each of said mobile terminals that is transmitting in CBA slot k to move to CBA slot (k+1) if k<m or move to a wait state if k=m in the subsequent super-frame;

said wait state having a wait state window size that is set to non-zero positive integer value control field indicating the number of active requests×wait state factor wherein said wait state factor can be assigned a non-zero positive integer value;

whenever said request message is interpreted as bandwidth request CBA packet drop due to collision in CBA slot 1 by a mobile terminal that is transmitting in CBA slot m, a local counter in the said mobile terminal is set to zero, and the said local counter is incremented every super-frame in the subsequent super-frames until the said local counter value is equal to the said non-zero positive integer value control field indicating the number of active requests×wait state factor;

whenever a mobile terminal in said wait state has said local counter value equal to said non-zero positive integer value control field indicating the number of active requests×wait state factor, said mobile terminal starts contending in CBA slot 1 in the subsequent super-frame if said mobile terminal's internal queue value is greater than zero; and, whenever a mobile terminal that is transmitting in CBA slot k, where k∈[1, 2, 3, . . . , m] for a MAC super-frame with m CBA slots, and said internal queue value of the said mobile terminal is equal to zero, said mobile terminal moves to an idle state after a static time-out interval.

* * * * *